United States Patent [19]

Jacobsen

[11] 4,250,648
[45] Feb. 17, 1981

[54] APPARATUS FOR USE IN FISHING

[76] Inventor: Kevin N. Jacobsen, 39 Howth Rd., Clontarf, Dublin 3, Ireland

[21] Appl. No.: 24,104

[22] Filed: Mar. 26, 1979

[51] Int. Cl.³ .............................................. A01K 97/00
[52] U.S. Cl. ........................................... 43/4; 43/27.4
[58] Field of Search ............................. 43/4, 4.5, 27.4

[56] References Cited

U.S. PATENT DOCUMENTS

| 2,511,828 | 6/1950 | Andrist | 43/4 |
| 2,670,556 | 3/1954 | Hopkins | 43/4 |
| 3,626,630 | 12/1971 | Tison | 43/27.4 |
| 3,841,011 | 10/1974 | Tison | 43/27.4 |
| 4,015,359 | 4/1977 | Andrews | 43/4 |
| 4,068,399 | 1/1978 | Bjorshol | 43/4.5 |

FOREIGN PATENT DOCUMENTS

| 92762 | 9/1958 | Norway | 43/4 |
| 1116059 | 6/1968 | United Kingdom | 43/4 |

OTHER PUBLICATIONS

*World Fishing*, "New Hope for Longlining", Sep. 1971, pp. 26-27.

*Primary Examiner*—Nicholas P. Godici
*Attorney, Agent, or Firm*—Thomas R. Morrison

[57] ABSTRACT

In order to facilitate the baiting of fishing lines of the kind having hooks spaced apart along them, such as are used in "long line" fishing, there is provided a method of baiting according to which the line is drawn through an elongated tubular member into which bait is fed. A blocking device in the form of a brush-assembly having flexible brush-bristles is provided in association with the outlet of the tubular member, so as to retain a mass of bait in the tubular member, while allowing bait which has been impaled by the hooks as the line passes through the tubular member, to pass freely out of the outlet. Apparatus for carrying out this method is also disclosed.

10 Claims, 5 Drawing Figures

APPARATUS FOR USE IN FISHING

BACKGROUND AND SUMMARY OF THE INVENTION

This invention relates to an apparatus for use in handling and baiting long fishing lines of the kind which are used with sea-going fishing vessels, for catching white-fish such as cod, ling, ray, turbot, plaice and haddock by the method known as "long line" fishing.

Such fishing lines have hooks spaced apart along the main line and attached to the main line by short trailing lengths of line called "snoods". The individual hooks have to have pieces of bait attached thereto, the bait-material used when fishing for white-fish usually being cut-up pieces of mackerel or herring.

In the past baiting of the hooks of such fishing lines has been carried out manually, either aboard the vessel, or even ashore. In the latter case, spare sets of fishing lines have to be provided so that spare lines can be baited by shore personnel while the vessel is at sea, so that a supply of baited lines will be available when the vessel returns to port after each fishing voyage. In that event an excessive number of fishing lines has to be provided, while in either case (i.e. using manual baiting either aboard the vessel or ashore) the manpower requirement is excessive.

Devices have been proposed for baiting such fishing lines mechanically but the devices proposed have not been found satisfactory in use. In some cases, it has been found that a line emerging from such a device has bait engaged with only relatively few of the hooks on the line; that is to say, the "success rate" of baiting is poor. In other cases it has been found that even when a substantial number of the hooks emerging from the device do have bait engaged therewith, such bait is not firmly engaged with the hooks and tends to fall off the hooks, or else that the construction of the device is such that there is a tendency for the bait to be knocked off the hooks, for example because the line has to pass through a narrow aperture as it emerges from the device.

It is therefore an object of the present invention, to provide an improved method and apparatus for baiting fishing lines.

A further object of the invention is to provide apparatus which will enable a line to be baited in a continuous operation, as it is paid out from the fishing vessel.

During fishing operations using a fishing line of the above-mentioned kind, as the line is hauled inboard, the fish may be removed from the hooks, the hooks may then be cleaned and the line with the snoods and hooks carried thereby may then be fed to a magazine, in which the line is stored until required for a further fishing operation. It is a still further object of the invention, to provide an improved form of line-magazine.

BRIEF DESCRIPTION OF THE DRAWINGS

The invention will be more fully understood from the following description, given by way of example only, of one form of apparatus constructed in accordance therewith. In the drawings.

DESCRIPTION OF THE PREFERRED EMBODIMENT OF THE INVENTION

Figure 1:
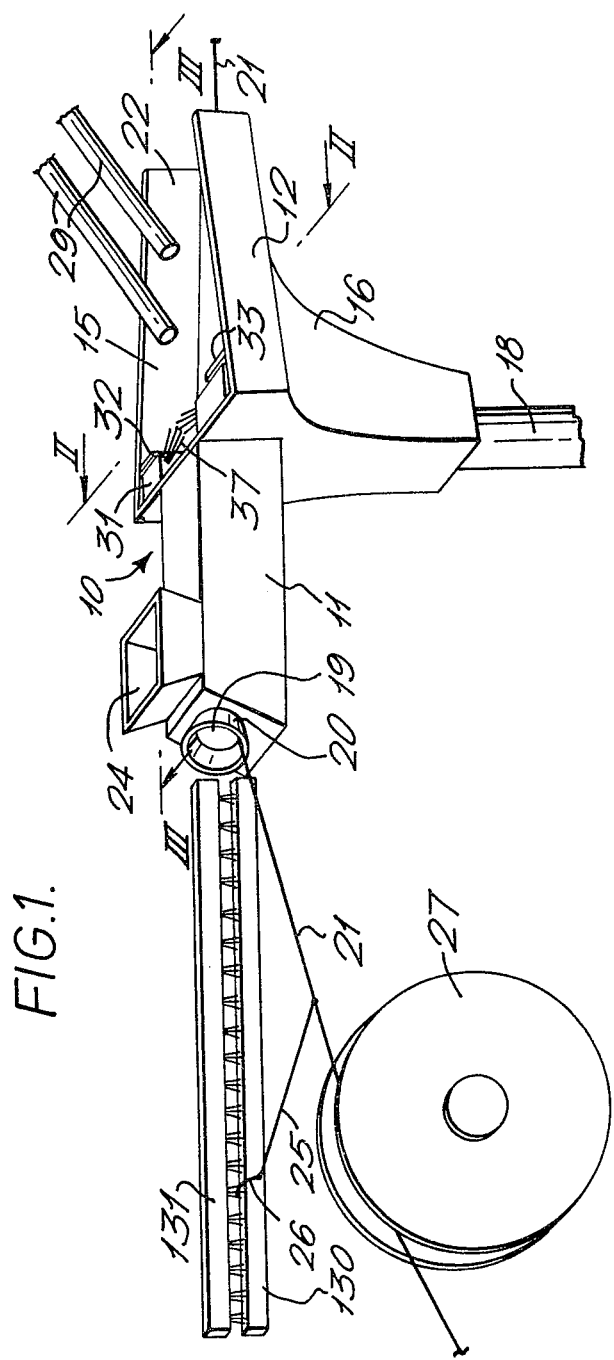
FIG. 1 is a perspective view of the main part of the apparatus, including the baiting device proper.

The apparatus which will now be described, includes a baiting device for carrying out the operation of baiting a fishing line of the kind having hooks spaced apart along it and attached to the main line by "snoods", and a magazine for storing the line to be baited. The baiting device and the magazine are shown respectively in FIG. 1 and FIG. 4 and in order to obtain an overall view of the apparatus, it is necessary to consider FIGS. 1 and 4 together. The components of the apparatus are shown somewhat diagrammatically, without the supporting means therefor being shown. In practice, the components of the apparatus are carried by a suitable frame-work (not shown in the drawings) which is mounted aboard a fishing vessel.

Referring to FIG. 1, there is shown a baiting device indicated generally at 10, which comprises a hollow body fabricated from stainless steel by welding and consisting of an elongated tubular member 11 of rectangular cross-section, welded to a funnel-member 12. As can best be seen in FIG. 3, the internal passage 13 in the tubular member 11 opens into the funnel-member 12 by way of a rectangular opening 14. Thus the funnel-member 12 serves as a receptacle to receive surplus bait discharged from tubular member 11 by way of the opening 14.

The upper part of the funnel-member 12 consists of an open trough-like portion 15, while the lower part 16 is of downwardly convergent form and leads to a discharge orifice 17 (FIG. 2) communicating with a discharge pipe 18.

At the end of the tubular member 11 opposite to the opening 14, the member 11 has an opening 19 fitted with a conical guide-member 20. The openings 19 and 14 provide respectively, an inlet and an outlet spaced apart along the length of the member 11, by means of which a line 21 can pass into and out of the member 11 and thence through the through-portion 15, emerging through opening 22.

At its upper part, the member 11 has an opening 23 (FIG. 3) fitted with a hopper 24 for bait to be fed into the member 11, in the form of a sloppy mixture made by mixing cut-up bait with water.

As the line 21 passes through the guide-member 20 and into the passage 13, the guide-member 20 serves to align snoods 25 carried by the line 21, so that the snoods 25 and hooks 26 carried thereby pass into the passage 13 without becoming twisted or tangled.

Figure 3:
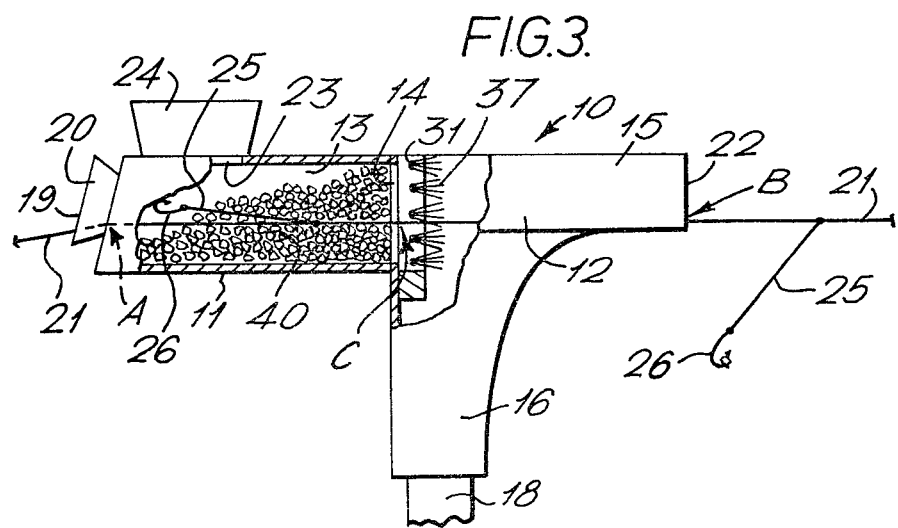
FIG. 3 is a sectional view on the line III—III in FIG. 1.

The line 21 is guided towards the opening 19 by way of a pulley 27. Referring to FIG. 3, it will be seen that the configuration of the whole arrangement is such that the line 21 bears on the one hand, on the lower edge of inlet opening 19 at A and on the other hand, on the lower edge of opening 22 at B, and follows a rectilinear track between these two points, passing through approximately the central point of opening 14 at C.

Figure 2:
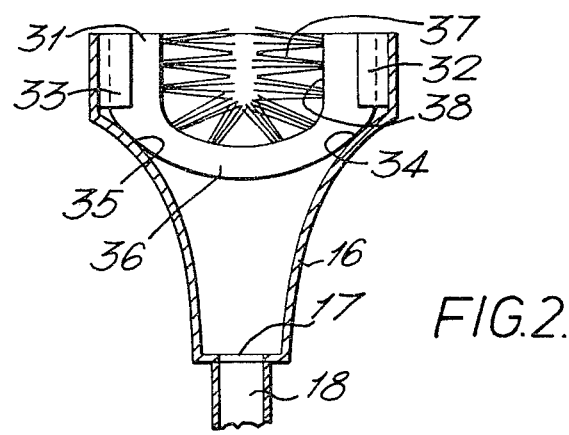
FIG. 2 is a sectional view on the line II—II in FIG. 1.

A brush-assembly 31 is fitted into the though-portion 15, by being slid vertically downwards behind two brackets 32,33 welded at suitable positions in the trough-portion, and rests on the walls of the convergent lower part 16 of funnel-member 12, at 34,35 (FIG. 2). The brush-assembly 31 consists of a U-shaped wooden block 36 which forms a mounting for brush-bristles 37. The bristles 37 are mounted to extend generally radially relatively to aperture 38 in U-shaped block 36, but so as to be inclined outwardly relatively to the plane of block 36, thus projecting into the trough-portion 15, as most clearly shown in FIG. 3.

As bait is fed by way of the hopper 24, it collects in the passage 13 of the member 11. The array of bristles 37 serves to retain a mass of bait 40 in the passage 13 and, as the line 21 with the hooks 26 thereon is drawn through the mass of bait, pieces of bait are impaled by the hooks. Because of the flexibility characteristics of the bristles 37, the hooks and the pieces of bait carried thereby are able to pass through the outlet 13 without the bait becoming detached from the hooks. At the same time, a considerable amount of loose bait also escapes past the bristles and falls into the funnel-member 12. Any bait which subsequently falls off the hooks also drops into the funnel-member 12.

Hoses 29 are provided in association with the trough-portion 15, so as to direct jets of water into the latter, and bait is washed down into the convergent part 16 and thence into the pipe 18, from which it is collected for re-use. The baited line 21 emerging from the baiting device through opening 22 is paid out continuously into the sea.

Bait which is washed down the pipe 18 may be led by means of a hose (not shown) into a container which is trailed over the side of the vessel in the sea and is thus kept fresh for subsequent re-use.

The bristles 37 are commercially available nylon brush-bristles of a grade stiff enough to ensure that the mass of bait 40 is retained in the passage 13, but not so still as to hamper the individual baited hooks from passing out of the outlet 14, or to cause bait to be torn off from the hooks. It is not the intention that the bristles 37 should prevent all unhooked bait from passing through the outlet 14. This would require an unacceptable degree of stiffness in the bristles. In practice, approximately 30% of the bait fed to the hopper 24 eventually falls down loose into the funnel-member 12. However, there is no disadvantage in this, since all the loose bait is recovered and re-used.

As the line 21 passes through the mass of bait 40 in the member 11, the individual hooks may pick up several pieces of bait, some of which may be knocked off the hooks as the line passes through the trough-portion 15, or may be washed off by the water jets from the hoses 29. However, it is found in practice that over 90% of the hooks have sufficient bait still engaged therewith.

In carrying out the method of the invention, the bait used will usually be cut considerably smaller than has customarily been the case hitherto. Preferably the bait (e.g. mackerel or herring) is cut into cubes having an edge-dimension of from 10 mm to 20 mm and the cut bait is mixed with water to provide a mixture of the desired sloppy consistency.

When using cut bait of this size, as the hooks 26 pass through the member 11, several pieces of bait may be hooked on each individual hook. However, as each hook passes through the member 11, some of these pieces of bait may be knocked off and replaced by others which become more securely hooked, in what may be regarded as a "hit and miss" process.

Figure 4:
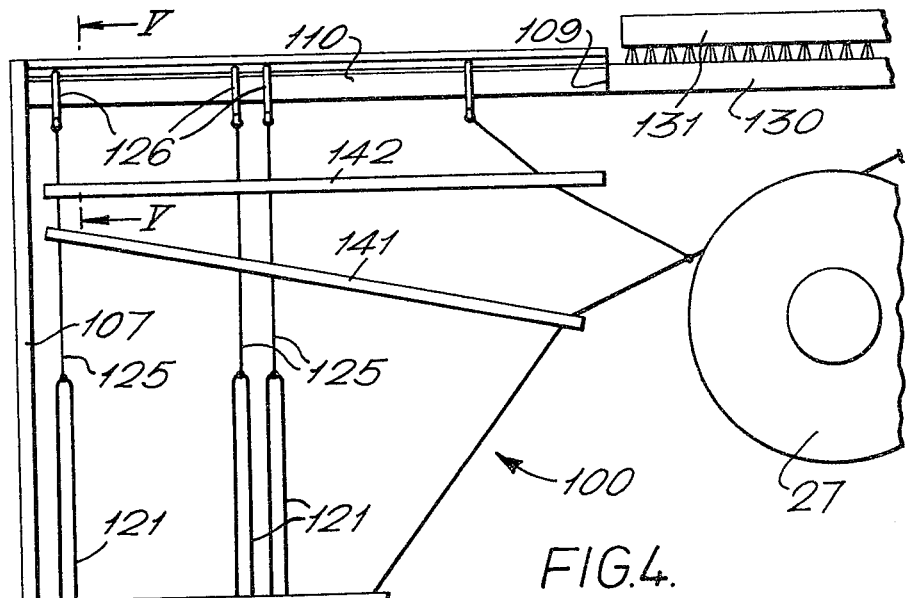
FIG. 4 is an elevational view showing a line-magazine which is used in conjunction with the baiting device of FIG. 1.

The line to be baited is fed to the baiting device 10 from the line-magazine shown in FIG. 4 and designated generally by the reference numeral 100. The magazine comprises a narrow upright box-like structure 101, having side walls of trapezium-shape, with two narrow end walls between them. Thus one of the end walls 102 is upright while the other end wall 103 is inclined to the vertical. Only one of the trapezium-shaped side walls is visible in the drawing. It consists of a wooden frame 104 having an opening 105 fitted with wire-mesh 106, so that air can circulate through the magazine to assist in drying the line therein.

The end wall 102 is extended upwardly to form an upright 107 which supports a rail-member 110 projecting horizontally from the upright 107. When a line to be stored is fed into the magazine, the hooks of the line are slid into engagement with the rail-member 110, a few such hooks being shown in FIG. 4 and designated 126. The snoods 125 hang downwardly from the hooks 126 and thus the main line is suspended in loops 121 in the box 101.

The magazine 100 as a whole, is slidable into and out of the operative position shown in FIG. 4. The full magazine is slid into position in the direction indicated by the arrow a in FIG. 4, and the end 109 of the rail-member 110 is thus brought into end-to end engagement with a fixed rail 130 which is visible in both FIG. 4 and FIG. 1.

After the line has been withdrawn from the magazine for baiting, the magazine is removed by sliding it outwards in the opposite direction to the arrow a. A further line can then be fed into the empty magazine by sliding the hooks of the line into engagement with the rail-member 110, from the free end 109. The snoods 125 then hang down in the manner previously described, and the loops 121 of the main line are packed into the box 101.

Figure 5:
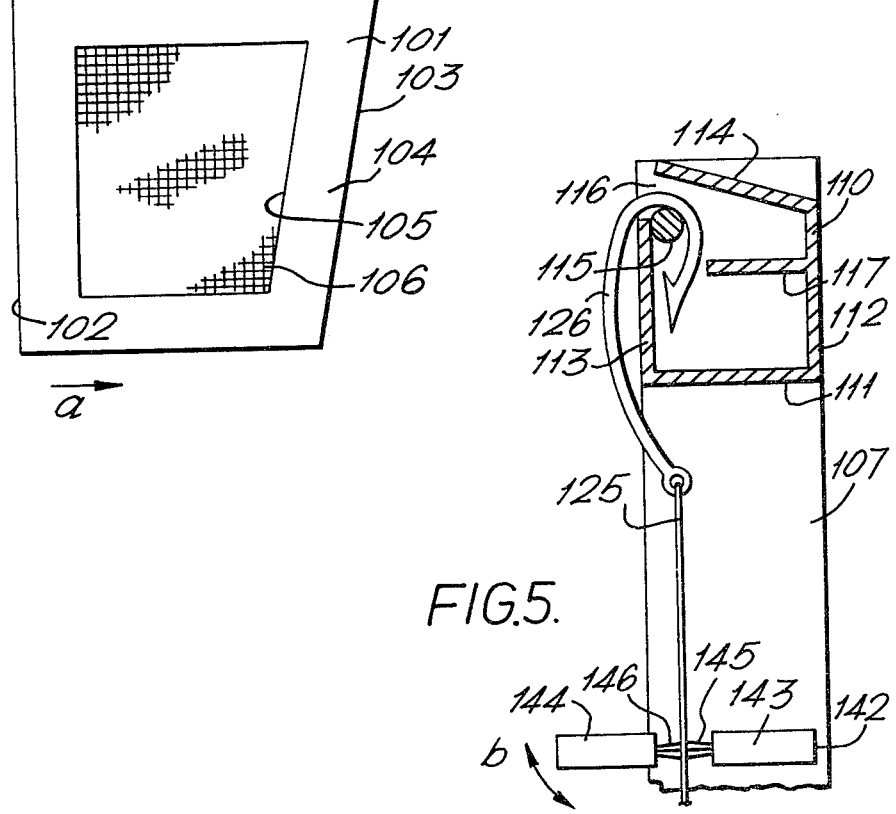
FIG. 5 is a fragmentary view of the magazine shown in FIG. 4 in section on the line V—V in FIG. 4, drawn to a larger scale.

The rail-member 110 is made of stainless steel and, as can be seen in FIG. 5, it has a hollow profile consisting of a bottom wall 111, two upright walls 112,113 and an upper wall 114. A rod 115 of circular cross-section is welded to the edge of the wall 113. The upper wall 114 projects from the wall 112 towards the wall 113, and thus defines with the rod 115, a slot 116. An intermediate wall 117 extends from the wall 112, internally of the hollow profile. Successive hooks are slid into engagement with the rail-member 110, starting from the free end 109, with each hook 126 being engaged in the slot 116, and being guided in its sliding movement along the rail-member 110, by the rod 115 and the intermediate wall 117.

Two brush-assemblies 141,142 are supported by the framework of the apparatus. As can be seen from FIG. 5, the upper brush-assembly 142 consists of two wooden battens 143,144, each carrying a row of brush-bristles 145,146.

As shown in FIG. 4, the lower brush-assembly 141 is mounted so as to extend at an angle to the upper brush-assembly 142. It is of similar construction to the assembly 142, but its bristles are stiffer.

One of the battens of each brush-assembly 141,142 is mounted so as to be pivotable towards and away from the other batten of the assembly, as indicated in the case of the batten 144 in FIG. 5, by the arrow b. In order to bring the full magazine 100 into the position shown in FIG. 4, by sliding movement in the direction of the arrow a as previously described, it is necessary for the movable brush-battens of the assemblies 141,142 to be pivoted into displaced positions, so as to allow the snoods 125 to pass between the opposed rows of bristles. When the magazine has been brought into its final position, the movable brush-battens are returned to their normal positions, so that the snoods are engaged by the opposed rows of bristles. This position is shown in FIG. 5, where bristle-rows 145,146 are shown engaging snood 125.

In order to carry out the baiting operation, the line is drawn out from the box 101, over the pulley 27 and thus into the inlet 19 of the tubular member 11. As the line is drawn out in this way, the individual snoods are pulled out of engagement with the brush-assemblies 141,142 and successive loop portions 121 of the main line are thus pulled up into engagement with the brush-assembly 141 as shown in FIG. 4. This movement is assisted by the inclined configuration of the wall 103. Thus the line is guided into correct alignment with the pulley 27. At the same time each individual snood 125 is pulled towards the pulley 27 so that the associated hook 126 slides along the rail 110, under the control of the brush-assembly 142.

The successive hooks then slide from the rail 110 on to the rail 130 and along the latter towards the inlet 19. A further brush-member 131 is provided above the rail 130, with its bristles in engagement with the upper edge of the rail 130, so that these bristles serve to control the sliding movement of the hooks along the rail 130. Finally, the snoods and hooks are guided into the inlet 19 by the action of the guide-member 20, in the manner previously described.

I claim:

1. Apparatus for use in baiting a fishing line of the kind having longitudinally spaced apart hooks thereon, the apparatus comprising a horizontally elongated tubular enclosure member having inlet and outlet openings at opposite ends thereof and an internal through passage therebetween for passage of a line therethrough, an opening in said tubular member for feeding bait thereinto, a receptacle connected to said tubular member at the outlet end thereof, said receptacle including a longitudinally extending trough having a discharge opening at the end thereof remote from the tubular member, and a brush-assembly positioned at the outlet opening of said tubular member having flexible brush-bristles arranged to extend generally radially of said outlet opening, said brush-assembly being thus adapted to retain a mass of bait in the tubular member but to allow bait impaled by the hooks to pass freely from said outlet opening when a line with hooks thereon is drawn through the mass of bait in the tubular member, said inlet and outlet openings and the discharge opening at the end of said receptacle being so arranged relative to each other elevationally such that a fishing line passing through said tubular member and receptacle bears on the lower edges of said inlet and discharge openings and follows a rectilinear path therebetween and passes through approximately the center of said outlet opening.

2. Apparatus according to claim 1, wherein said receptacle includes a downwardly converging section and a discharge orifice adjacent the lower extremity thereof, said receptacle being thus adapted to communicate with a bait storage container for storage of bait for recycling.

3. Apparatus according to claim 1, wherein the brush-assembly comprises a U-shaped element forming an aperture which partially surrounds the outlet opening of said tubular member, the said brush-assembly being removably mounted in said receptacle.

4. Apparatus according to claim 2, including water-jets positioned above said receptacle for flushing bait which accumulates in the trough thereof towards the discharge orifice.

5. Apparatus according to claim 1, further comprising a magazine for holding the fishing line to be baited and guide means for feeding said line from the magazine to said inlet opening of said tubular member, said magazine including a rail-member which extends substantially horizontally in the position of use of said magazine and which is adapted to receive in sliding engagement the hooks of the line to be baited, whereby when hooks of the line are engaged with said rail-member portions of the line are suspended from the hooks below the rail-member.

6. Apparatus according to claim 5, including friction means adapted to engage successive portions of said line suspended from the hooks engaged with said rail-member so as to control movement of the line into engagement with a pulley comprising said guide means located between the magazine and the inlet opening of the tubular member as the line is withdrawn from the magazine.

7. Apparatus according to claim 6, wherein said friction means comprise at least one pair of mutually opposed brush-assemblies mounted in operative relationship to said rail-member so as to be engageable with suspended portions of said line from opposite sides thereof thereby to cooperate in controlling movement of the line.

8. Apparatus according to claim 7, wherein at least one brush-assembly of each said pair of brush-assemblies is mounted for movement towards and away from a position in which it cooperates with the other brush-assembly of said pair thereby to allow line-portions suspended from the hooks engaged with the rail-member of the magazine to be inserted between said brush-assemblies during sliding movement of said magazine into its said operative position.

9. Apparatus according to claim 5, wherein a further rail-member is provided, extending from the said rail-member of the magazine, towards the inlet of the tubular member, so that hooks of a line stored in the magazine, can slide from the rail-member of the magazine, into engagement with the said further rail-member.

10. Apparatus according to claim 9, wherein the said guide means comprises a pulley to feed a line from the magazine to the inlet of the tubular member, as hooks on the line slide along the respective rail-members towards the said inlet.

* * * * *